March 30, 1954  F. D. SAWYER  2,673,507
IMPLEMENT HITCH GUIDE
Filed Sept. 24, 1951
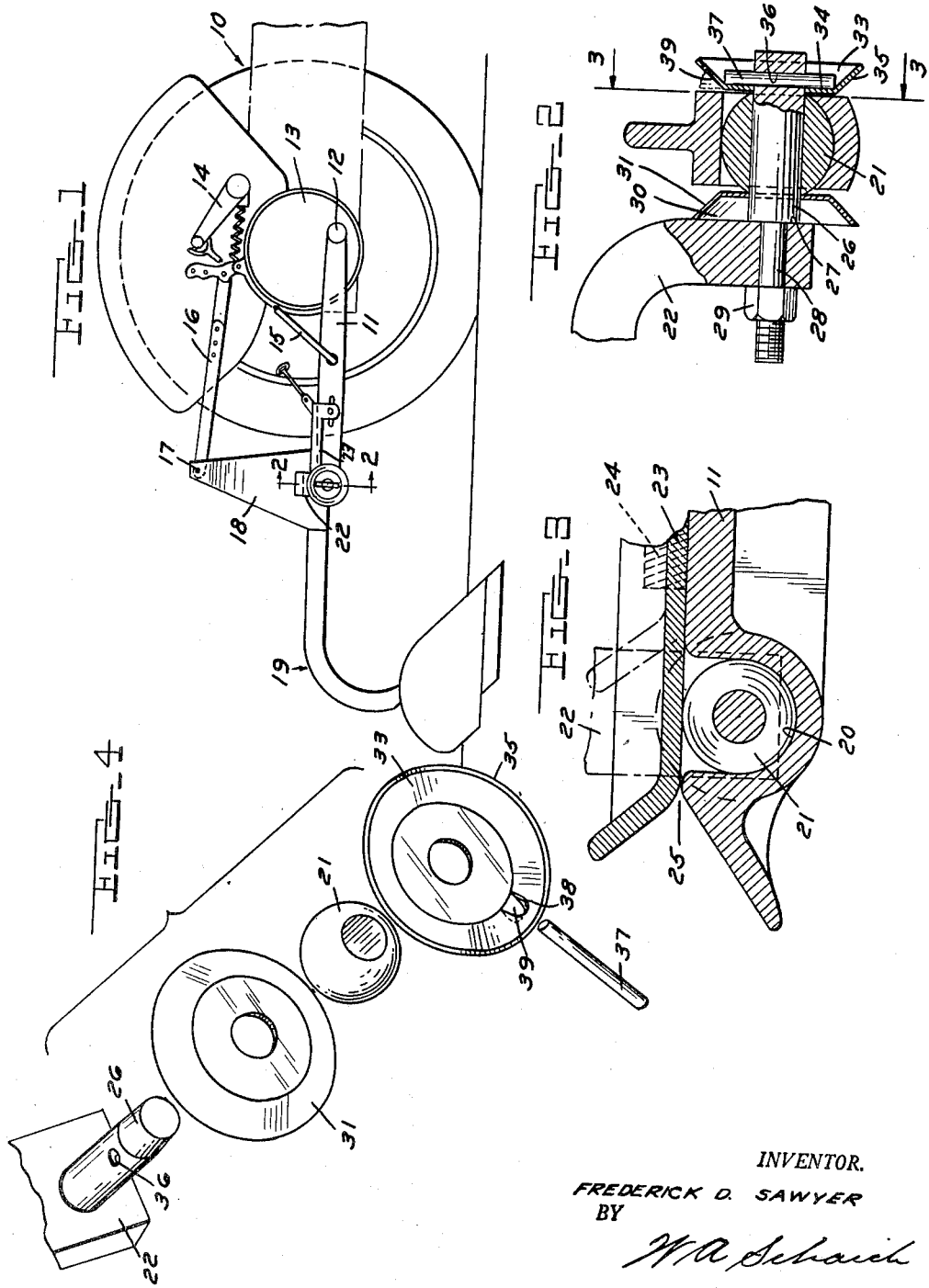
INVENTOR.
FREDERICK D. SAWYER
BY
ATTORNEY Patented Mar. 30, 1954

2,673,507

UNITED STATES PATENT OFFICE 2,673,507

IMPLEMENT HITCH GUIDE

Frederick D. Sawyer, Wayne, Mich., assignor to Dearborn Motors Corporation, Birmingham, Mich., a corporation of Delaware Application September 24, 1951, Serial No. 248,055

5 Claims. (Cl. 97—47.14)

The present invention relates to an implement hitch guide and more particularly to a means for guiding a link element onto a link attachment bearing.

The present invention provides a simple and readily attachable implement hitch guide which is particularly adapted to direct a self-locking link element onto a link attachment bearing. The link attachment bearing is preferably mounted on an implement A-frame or the like for the reception of rearwardly extending, forwardly converging hitch links mounted on a tractor. The guides, when utilized with self-locking link elements, serve to direct the link elements onto the bearings, so that it is not necessary to manually attach the link elements to the implement, as is necessary in conventional tractor-implement connections of the type having a pair of laterally spaced hitch link elements.

The guide of the present invention comprises a generally convexo-concave guide plate adapted to be secured to a laterally extending pin in juxtaposition to a link attachment bearing. The plate is provided with a peripheral outwardly projecting lip surface for directing the link element onto the bearing, and the plate is secured to the mounting pin by a locking pin insertable through an aperture in the lip registerable with an aperture in the mounting pin and provided with a deflectable cover portion cut from the lip. After the locking pin has been inserted through the registering apertures to lie against the concave surface of the guide plate, the deflectable lip portion is deformed over the locking pin, so that the pin is locked in position and a smooth lip guiding surface is provided.

It is, therefore, an important object of the present invention to provide a readily attachable and efficient implement hitch guide.

Another important object is the provision of an implement hitch guide plate adapted to direct a self-locking link element onto a link attachment bearing, the guide plate being secured adjacent the bearing by means of a locking pin insertable through the guide plate.

It is a further object of this invention to provide an implement link attachment comprising an attachment bearing disposed on a lateral mounting pin and a guide plate also disposed on the mounting pin and having an outwardly flaring lip for directing a link element onto the bearing, the plate being secured to the mounting pin by a locking pin engaging the plate inwardly of the lip and projecting through the mounting pin.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a side elevational view of a tractor and implement secured together through an implement hitch provided with a guide of the present invention;

Figure 2 is a fragmentary sectional view, with parts shown in elevation, taken along the plane II—II of Figure 1;

Figure 3 is a sectional view, with parts shown in elevation, taken along the plane III—III of Figure 2; and Figure 4 is an exploded elevational view illustrating an implement hitch link attachment provided with a guide of the present invention.

As shown on the drawings:

In Figure 1, reference numeral 10 refers generally to the rear portion of a tractor of well-known make provided with a pair of rearwardly extending hitch link elements 11 pivotally attached, as at 12, to a tractor rear axle housing 13. The links 11 are power-liftable through a pair of laterally spaced hydraulically actuated lift arms 14 attached to the link elements 11 through members 15, as is well-known in the art. A top link 16 is also provided to project rearwardly from the tractor 10, the top link being connected, as at 17, to an upper portion of an implement A-frame 18 forming a portion of an implement 19, such as the plow.

The link elements 11 terminate in open topped notches 20 which are adapted to receive therein generally spherical link attachment bearings 21 secured to a cross member 22 of the implement A-frame. The link elements 11 are also provided with longitudinally slidable cover members 23 which are adapted to be urged rearwardly, as by springs 24, to overlie the notches 20, thereby securing the links to the attachment bearings. It will be noted that the extreme rear ends of the link elements 11 and of the slidable members 23 are oppositely deflected, so as to provide a generally V-shaped notch 25 therebetween. As the tractor 10 is attached to the implement 19, the tractor is backed toward the implement with the link elements 11 in approximate vertical alignment with the attachment bearings 21, so that the bearings first enter the notches 25 to abut the extreme rear ends of the elements 11 and 23. As the tractor is further backed into the implement, the slide elements 23 are forced forwardly against the action of the spring 24 (as indicated in dotted outline in Figure 3), so that the bearings 21 enter the notches 20 and the slide elements 23 are then urged rearwardly by the spring 24 to overlie the bearings, thereby completing the attachment of the follower link elements 11 to the implement 19. Following attachment of the lower links 11, the upper link 16 is then manually attached to the implement A-frame, as at 17.

The link elements 11 and the latching mechanism carried thereby are more fully disclosed and claimed in the copending application of Emery E. Kuhary and myself, Serial No. 248,058, filed on even date herewith and assigned to the assignee of the present invention.

From Figures 2 and 4, it will be noted that the attachment bearings 21 are disposed upon attachment pins 26 which project laterally from the implement A-frame member 22, the pins 26 having an inner shoulder 27 abutting the outer surface of the member 22 and a reduced diameter portion 28 extending through the member 22 and receiving a nut 29 threaded thereon. Between the bearing 21 and the member 22, there is secured a guide plate 30 of generally convexo-concave configuration including an outwardly flared frustro-conical lip 31 providing a peripheral guiding surface.

Adjacent the extreme free end of the pin 26 on that side of the bearing 21 opposite the guide plate 30, there is provided a second guide plate 33 of substantially the same configuration as the guide plate 30. The second guide plate 33 has a central planar portion 34 adapted to abut, or to be closely spaced from, the bearing 21 and a generally frusto-conical peripheral lip 35 projecting from the portion 34 and from the bearing 21 to surround the outer extremity of the pin 26. The pin 26 is radially apertured, as at 36, to receive therethrough a locking pin 37 projecting radially beyond the pin 26 and abutting that surface of the plate portion 34 opposite the bearing 21. It will be noted that the pin 37 is of a length corresponding approximately to the diameter of the planar portion 34 of the guide 33 and the pin abuts the plate portion 34 throughout substantially the entire pin length so that the plate 33 is secured to the pin and the entire attachment assembly, including the first guide plate 30, and the bearing 21 is also fixed to the pin 26 by the locking pin 37. In order to assemble the plate 33 on the pin 26 by means of the locking pin 37, a portion of the lip 35 is severed, as at 38, to provide a tang 39 which is initially deformed from the lip 35 to lie substantially in the plane of the central plate portion 34. The radially extending tang 39 thus provides an aperture through which the locking pin 37 may be inserted, so as to project through the aperture 36 of the pin 26, and after insertion of the pin 37, the tang 39 is deformed so as to lie in the plane of the lip 35, thereby closing the aperture through which the pin 37 was inserted.

Thus it will be seen that the present invention provides a novel implement hitch guide and link attachment assembly for an implement hitch. Although the hitch attachment assembly has been particularly described as positioned upon the implement 19, it will be appreciated that the attachment assembly may be secured to the tractor, so that the links are carried by the implement for attachment to the tractor rather than vice versa as hereinbefore described. Further, it will be appreciated that the hitch guide need not snugly abut the bearing 21, since contact of the hitch link elements 11 with the guide lip 35 will merely force the guide plate to pivot upon the pin 26, in the event the guide plate does not abut the bearing, so that even greater guiding action is obtained.

A greatly desirable feature of the guide plate and attachment assembly of the present invention is the ease of attachment of the same to the pin 26, and this attachment may be easily accomplished under field conditions without the necessity of specialized tools. This quick attachment makes possible the conversion of existing implements for use with self-locking link elements, such as those hereinbefore described, to greatly enhance the commercial applicability of such link elements. Further, the frusto-conical lip presents a smooth, continuous guiding surface and the mounting pin may be rotated without interrupting guiding action.

It will, of course, be understood that various details of construction may be varied through a wire range without departing from the principles of this invention and it is, therefore, not the purpose to limit the patent granted hereon otherwise than necessitated by the scope of the appended claims.

I claim:

1. An implement hitch guide adapted to direct a self-locking link element onto a link attachment bearing disposed on a laterally freely projecting pin comprising a generally convexo-concave plate of a diameter substantially greater than the diameter of said bearing and having a generally frusto-conical outer lip, said plate being adapted for disposition on said pin with the convex side thereof immediately adjacent said bearing and the plate lip projecting therefrom, and a securing pin adapted to abut the concave face of said plate to extend thereacross inwardly of said lip in engagement with said lateral pin to secure said plate thereto adjacent the free end of said pin.

2. In a link attachment for an implement hitch having an attachment bearing mounted on a cylindrical bearing pin having a free cantilever end, a hitch link guide comprising a generally convexo-concave guide plate of a diameter substantially greater than the diameter of said bearing and having a central circular portion for abutting said bearing to extend substantially radially of said pin and a frusto-conical outer lip projecting from said bearing radially outwardly therebeyond and encircling an adjacent portion of said bearing pin, and a securing pin abutting said central plate portion and encompassed within said lip for projecting through the free cantilever end of said bearing pin to secure said plate thereto.

3. A link attachment for an implement hitch comprising a laterally extending mounting pin, an attachment bearing encircling a portion of said pin, guide plates mounted on said pin on opposing sides of said bearing and each having an outwardly deflected generally frusto-conical lip providing a guide surface extending toward said bearing, said mounting pin having a radial aperture therethrough enclosed within the lip of one of said guide plates, a locking pin extending through said mounting pin aperture to contact the associated guiding plate, and a deflectable tang formed integrally with said associated guide plate and radially aligned with said pin for accommodating entry and removal of said pin therethrough.

4. A link attachment for an implement hitch comprising a mounting pin adapted to project laterally of the implement, a spherical attachment bearing disposed on said pin, a convexo-concave guide plate disposed on said pin with its convex face in juxtaposition to said bearing, registering apertures formed in said pin and said plate respectively, a locking pin insertable through the aperture in said plate to contact the concave face thereof, and a locking tang formed integrally with said plate for closing the aperture thereof following insertion of said locking pin therethrough, thereby securing said locking pin in position and preserving the smooth contour of said plate.

5. In an attachment for use with an implement hitch having a cylindrical bearing pin attached at one end to an implement and having its other end freely projecting therebeyond, said pin having means thereon defining a peripheral bearing surface encircling said pin, the improvements of a generally convexo-concave guide plate on said pin and of a diameter substantially greater than the corresponding dimension of said bearing surface radially of said pin, said plate having an inner radial portion in juxtaposition to said bearing surface and an outer lip providing an inclined guiding surface radially outwardly of said bearing surface and inclined generally axially and radially of said pin toward said bearing surface, and securing means carried by said pin adjacent said other end of said pin axially outwardly of said bearing surface and said plate to confine said guide plate between said securing means and said bearing surface, said securing means being encompassed within said plate outer lip to prevent accidental displacement thereof.

FREDERICK D. SAWYER.

References Cited in the file of this patent

UNITED STATES PATENTS

| Number | Name | Date |
|---|---|---|
| 2,250,661 | Thorp et al. | July 29, 1941 |